(12) United States Patent
Ek et al.

(10) Patent No.: US 7,311,868 B2
(45) Date of Patent: Dec. 25, 2007

(54) INJECTION MOULDING TOOL, METHOD OF INJECTION MOULDING AND A PACKAGING CONTAINER PROVIDED WITH AN INJECTION-MOULDED OPENING ARRANGEMENT

(75) Inventors: Goran Ek, Lomma (SE); Hakan Hakansson, Lomma (SE)

(73) Assignee: Tetra Laval Holdings & Finance S.A., Pully (CH)

(*) Notice: Subject to any disclaimer, the term of this patent is extended or adjusted under 35 U.S.C. 154(b) by 460 days.

(21) Appl. No.: 10/493,234

(22) PCT Filed: Dec. 5, 2002

(86) PCT No.: PCT/SE02/02239

§ 371 (c)(1), (2), (4) Date: Apr. 21, 2004

(87) PCT Pub. No.: WO03/051603

PCT Pub. Date: Jun. 26, 2003

(65) Prior Publication Data

US 2004/0239005 A1 Dec. 2, 2004

(30) Foreign Application Priority Data

Dec. 19, 2001 (SE) .................................. 0104304

(51) Int. Cl.
*B29C 45/14* (2006.01)

(52) U.S. Cl. .................. 264/268; 264/328.12; 425/116; 425/129.1

(58) Field of Classification Search ................ 425/116, 425/129.1; 264/268, 328.12
See application file for complete search history.

(56) References Cited

U.S. PATENT DOCUMENTS 4,725,213 A    2/1988   Reil et al.
4,781,012 A *  11/1988  Reil et al. ..................... 53/452

(Continued)

FOREIGN PATENT DOCUMENTS

GB             1023886 A    3/1966

(Continued)

*Primary Examiner*—Robert B. Davis
(74) *Attorney, Agent, or Firm*—Buchanan, Ingersoll & Rooney PC

(57) ABSTRACT

The disclosure relates to a tool (1a, 1b, 2) for injection moulding of an opening arrangement (20) of plastic in a hole in a packing material (9), the hole defining a hole edge (8) and the tool displaying a mould cavity (7) which surrounds the hole edge (8) together with a part of a first side (9a), as well as a part of a second side (9b) of the packing material in connection with the hole edge, the mould cavity (7) displaying an inlet (10) for molten plastic and, opposing the inlet, an end gap (11) for the extension of the packaging material (9) out of the tool, the inlet (10) displaying a deflection from a first flow direction ($F_1$) in a flow gap (5) to a second flow direction ($F_2$) into the mould cavity (7). According to the invention, the tool (1a, 1a) displays, at said inlet (10), a throttle lip (12) which projects in a direction which substantially coincides with said first flow direction ($F_1$). The invention also relates to a method of injection moulding, as well as to a packing container with an injection moulded opening arrangement (20).

29 Claims, 3 Drawing Sheets

U.S. PATENT DOCUMENTS

| | | | |
|---|---|---|---|
| 4,813,837 A * | 3/1989 | Ball et al. ................... 413/12 |
| 4,828,138 A | 5/1989 | Andersson |
| 5,147,591 A * | 9/1992 | Yoshida ..................... 264/163 |
| 5,395,005 A * | 3/1995 | Yoshida .................... 220/359.2 |
| 6,106,261 A * | 8/2000 | von Holdt ................. 425/130 |
| 6,251,325 B1 | 6/2001 | Karlsson |
| 6,303,066 B1 | 10/2001 | Gustafsson et al. |
| 6,835,342 B2 * | 12/2004 | Gustafsson et al. ......... 264/267 |

FOREIGN PATENT DOCUMENTS

| | | |
|---|---|---|
| JP | 62211117 A | 9/1987 |
| JP | 9109155 A | 4/1997 |
| SU | 1755708 A3 | 8/1992 |
| WO | WO 97/35775 | 10/1997 |
| WO | WO-98/18609 * | 5/1998 |
| WO | WO 98/18609 | 5/1998 |

* cited by examiner

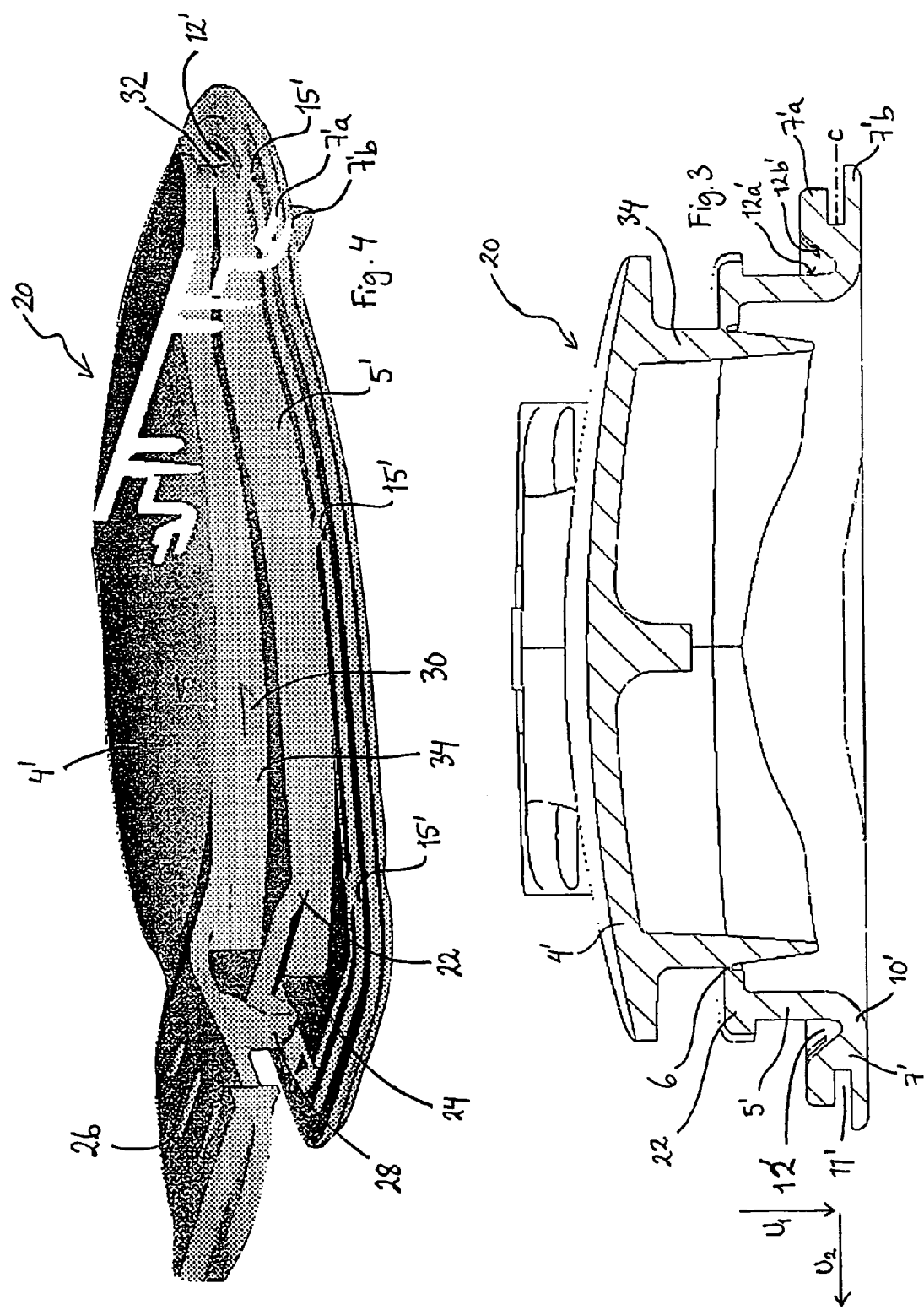

INJECTION MOULDING TOOL, METHOD OF INJECTION MOULDING AND A PACKAGING CONTAINER PROVIDED WITH AN INJECTION-MOULDED OPENING ARRANGEMENT

TECHNICAL FIELD

The present invention relates to a tool for injection moulding of an opening arrangement of plastic direct in a hole in a sheet- or web-shaped packaging material, the hole defining a hole edge and the tool comprising at least one first tool part adapted to be brought into contact with a first side of the packaging material, and at least one second tool part adapted to be brought into contact with a second side of the packaging material, in such a manner that there is formed a mould cavity which surrounds said hole edge, together with a part of the first side of the packaging material, as well as a part of the second side of the packaging material in connection with the hole edge. The mould cavity displays an inlet for molten plastic and, opposing the inlet, an end gap for the extension of the packaging material out of the tool, the end gap being located between the first and the second tool parts. The inlet displays a deflection from a first flow direction in a flow gap which defines an edge portion of the opening arrangement to be formed, to a second flow direction into said mould cavity which defines a surrounding portion around the hole edge of the opening arrangement. The present invention also relates to a method of injection moulding an opening arrangement direct in a hole in a sheet- or web-shaped packaging material, as well as a packaging container which is provided with an opening arrangement injection moulded according to the present invention. The packaging container and its opening arrangement are principally intended for pourable food products such as fruit juices, milk, wine, tomato sauce etc.

THE STATE OF THE ART AND PROBLEMS

A typical packaging container for pourable food products consists of a parallelepipedic packaging container known under the trademark Tetra Brik®, which is formed by fold forming and sealing of a laminated, web-shaped packaging material. The laminated packaging material comprises a layer of fibre material, e.g. paper or paperboard, which is covered on both sides with a thermoplastic material, e.g. polyethylene. If the packaging container is an aseptic packaging container for long shelf-life storage of foods, such as e.g. UHT milk (Ultra High Temperature), the packaging material also includes a layer of a barrier material, e.g. aluminium foil (Alifoil) which in its turn is covered with a layer of thermoplastic material which defines the inner surface of the packaging container, i.e. that surface which is contact with the food product. If the packaging container is to hold a pasteurised product which is cold-stored, there is normally no barrier layer.

Such packaging containers are produced in fully automatic machines in which a continuous tube is formed from the web-shaped packaging material. The web-shaped packaging material is sterilised if required and is then fed to a forming unit where it is bent in the longitudinal direction and heat-sealed for the formation of a tube. Thereafter, the tube is filled with the food product and heat-sealed subsequently with transverse seals in which the tube is then severed for the formation of cushion-shaped packaging containers which are thereafter fold formed mechanically so as to form the finished parallelepipedic packaging container.

Alternatively, the packaging material may be cut to sheet-shaped blanks which are formed around mandrels so as to form the packaging containers. Such packaging containers are thereafter filled with the food product and heat-sealed. One example of a prior art packaging container of this type is the so-called "gable top" package which is also known as Tetra Rex®.

It is known in the art to provide a packaging container of any of the above-mentioned types with a reclosable opening arrangement which is injection moulded in situ direct in a hole in the packaging material before this is converted into a packaging container. In such instance, the hot plastic fuses with the thermoplastic layer of the packaging material so that a tight opening arrangement is formed. Such an opening arrangement includes an edge portion which defines a pouring aperture as well as a lid which is provided with a hinge/fold indication to the edge portion. When the opening arrangement is injection moulded, the lid is integrated with the edge portion and sealed thereagainst in a thin, rupturable sealing portion which extends along a peripheral edge around the edge portion. Once this sealing portion has been ruptured, the lid can be moved between an open position and a closed position in which it co-operates with the edge portion in a substantially liquid-tight fashion.

An opening arrangement of the type intended here is disclosed in EP 00111550.0. WO 98/18609 also discloses an opening arrangement of corresponding type, it being discussed in the publication how a hole edge of the hole in which the opening arrangement is to be disposed might be positioned in a mould cavity in the injection moulding tool. In this instance, it is an object of the invention in the embodiment according to FIG. 6 that the opening arrangement display a portion at the hole edge, the portion surrounding the hole edge together with a part of the first side of the packaging material, as well as a part of the second side of the packaging material in connection with the hole. However, it has proved that the powerful plastic flow which, in the injection moulding, comes via a flow channel which defines the edge portion of the opening arrangement, runs the risk of splitting up the hole edge and/or of bending it in an uncontrollable manner so that the hole edge obstructs the path of the plastic flow to either side of the mould cavity of the tool which defines the surrounding portion. In this instance, there is a serious risk that the surrounding portion will uncontrollably be poorly formed and be formed either on the outside of the packaging container and/or on its inside.

U.S. Pat. No. 4,725,213 discloses yet another opening arrangement in which, according to the embodiment which is shown in FIG. 7, an edge portion is missing, in which event the lid merges direct into the surrounding portion. In this instance, a depression is provided between the lid and the surrounding portion, the depression forming the thin, rupturable sealing portion which is to be ruptured when the opening arrangement is opened. A drawback inherent in the opening arrangement according to U.S. Pat. No. 4,725,213 is that the outer part of the surrounding portion, i.e. that part which is disposed on the outside of the packaging container, is given priority in the injection moulding operation ahead of the inner part of the surrounding portion, the risk arising that the inner part will be incomplete. This is particularly the case since the hole edge, in a powerful plastic flow, runs the risk of being bent off towards the lower region in the mould cavity of the tool, which defines the inner part of the surrounding portion, the plastic flow to this lower region being obstructed by the hole edge. This is neither an optimum result nor even acceptable, since the formation and design of the inner portion is most important for the tightness of the opening arrangement in the unruptured state, i.e. in storage and transport.

Notwithstanding that said above, it is however also important that there be an outer portion which surrounds the hole edge and a part of the outside of the packaging container adjacent the hole edge. The reason for this is that in the absence of such an outer portion, e.g. in the manner as illustrated in FIG. 5 in WO 98/18609, the problem arises that moisture may penetrate into the paper in the hole edge and/or that the hole edge rises up. Both cases are undesirable—if moisture penetrates into the paper, this will swell and in the worst case scenario give rise to mildew which is seen as unhygienic by the end user. If the hole edge rises up, it will give a cheap and simple impression at the same as entailing a risk that the configurational stability of the packaging container deteriorates, in particular at folded edges and corners in the proximity of the opening arrangement.

BRIEF SUMMARY OF THE INVENTION

The present invention has for its object to address the above-described problem complex. In particular, the present invention has for its object to propose a packaging container with an opening arrangement which is injection moulded direct in an open hole in the packaging material therefor, and which displays a reliable and repeatably formed surrounding portion around the edge of the hole, the surrounding portion surrounding said hole edge together with a part of the first side of the edge. The present invention also has for its object to propose a tool for injection moulding and a method of injection which make for obviating or at least reducing the above-mentioned problems in the injection moulding process proper and consequential problems in the packaging container.

These and other objects are attained by means of the tool, the method and the packaging container according to the present invention as they are defined in the appended claims.

The inventive concept is based on the idea that the plastic flow in towards the mould cavity of the tool which defines the surrounding portion of the opening arrangement is guided with the aid of a throttle lip which projects in the same direction as the initial flow path in towards an inlet to the mould cavity. By optimising the design of this throttle lip, the plastic flow can be guided in such a manner that the formation of the inner region (i.e. the region on the inside of the packaging container) of the surrounding portion is given priority over the outer region thereof, at the same time as it is ensured that an outer region is de facto formed without the hole edge being bent so that it obstructs the plastic flow. In particular, this is realised in that the design of the throttle lip is optimised in such a manner that its tip/end lies substantially flush with a centre line of the end gap through which the packaging material extends out of the tool. The risk of bending is moreover reduced further according to one preferred embodiment by sealing lips and spacer grooves in the tool which are designed and disposed to reduce or eliminate the bending off of the hole edge.

In the formed packaging container, the throttle lip of the tool will take expression in the form of a depression between the surrounding portion of the opening arrangement and its edge portion.

The packaging material for the packaging container is preferably a laminated packaging material of the above-disclosed type under the section entitled The State of the Art. Suitable dimensions in the packaging material are defined by its rigidity which should be at least 260 mN, preferably at least 280 mN and even more preferably at least 300 mN, most preferably at least 320 mN and above all most preferably at least 340 mN. The packaging material is further suitably 200-800 μm, preferably 250-600 μm thick.

DETAILED DESCRIPTION OF THE INVENTION

The present invention will now be described in greater detail hereinbelow, with reference to one preferred embodiment. This is shown in the accompanying Drawings, in which:

FIG. 3 is a section through an opening arrangement which has been formed in the tool of FIG. 1; and FIG. 4 shows an opening arrangement which has been formed in the tool of FIG. 1, seen in perspective.

Figure 1:
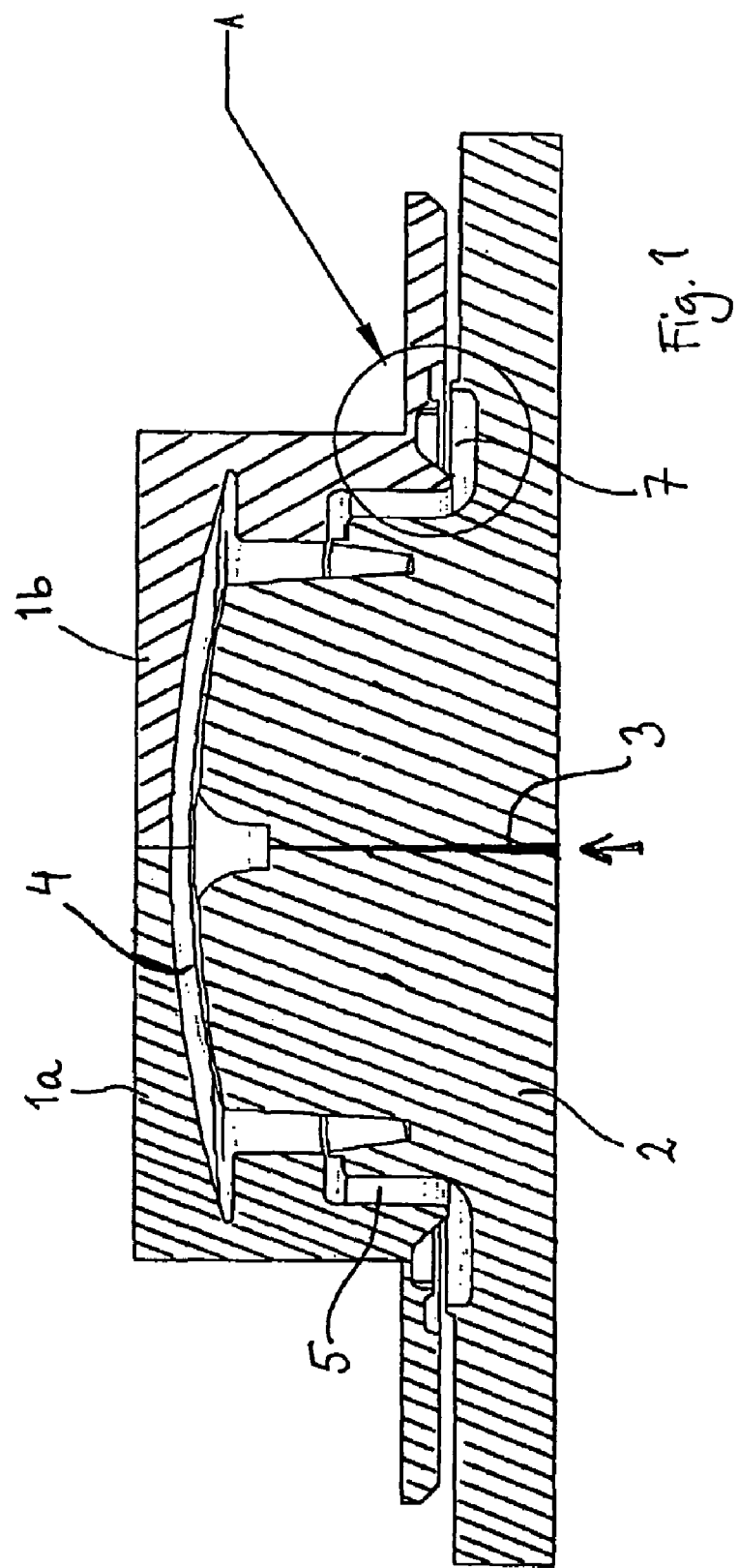
FIG. 1 is a section through a tool for injection moulding of an opening arrangement of plastic direct in a hole in a sheet- or web-shaped packaging material.
Figure 2A:
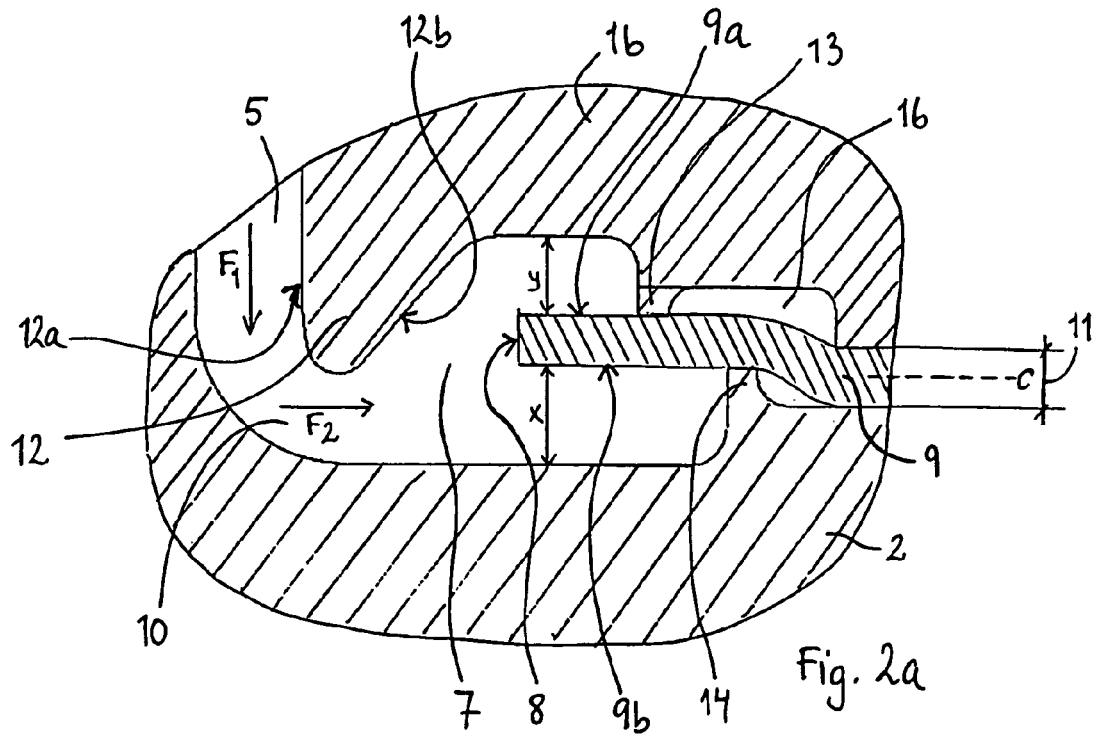
FIG. 2a shows, on a larger scale, a part of the tool of FIG. 1, with a hole edge of a packaging material disposed therein.

FIG. 1 shows the tool according to the present invention. This includes two first tool parts 1a and 1b, designed to form the outer profile of the opening arrangement on the first side of the packaging material, i.e. its outside. The tool also includes a second tool part 2 designed to form the inner profile of the opening arrangement on the second side of the packaging material. i.e. its inside. The second tool part 2 also displays an injection duct or channel 3 for the molten plastic flow, e.g. of polyethylene plastic which, for example at approximately 200° C. is to be injected into the tool. The injection channel 3 discharges in the centre of the tool and thereby the centre of the opening arrangement, i.e. in its lid cavity 4. The encircled section A, which is shown in magnification in FIG. 2a, shows the lower region of a flow gap 5, as well as a mould cavity 7 which defines a surrounding portion of the opening arrangement which surrounds the hole edge 8 of the packaging material 9 together with a part of the first side 9a of the packaging material, as well as a part of the second side 9b of the packaging material in connection with the hole therein. The mould cavity 7 displays an inlet 10 for molten plastic as well as an end gap 11 opposite the inlet for the extension of the packaging material 9 out of the tool, the end gap 11 being formed between the first 1a, 1b and the second 2 tool parts. The width of the end gap 11 is defined by the thickness of the packaging material, since the end gap abuts against each respective side of the packaging material. The inlet 10 forms a deflection from a first flow direction $F_1$ in the flow gap 5 which forms an edge portion of the opening arrangement, to a second flow direction $F_2$ into said mould cavity 7. According to the invention, the first tool part 1a, 1b displays, at the inlet 10, a preferably continuous throttle lip 12 which projects out in a direction which substantially coincides with the first flow direction $F_1$. The design of the throttle lip 12 is optimised in such a manner that its tip/end lies substantially flush with the centre line c of the end gap 11 through which the packaging material 9 extends out of the tool, the level of the tip of the throttle lip 12 preferably lying within 40%, even more preferably within 30% and most preferably within 20% from said centre line, calculated on the width of the end gap.

According to one aspect of the present invention, said first flow direction $F_1$ and said second flow direction $F_2$ make an angle of 20-120°, preferably 30-110° and even more preferably 40-100° with each other.

The throttle lip 12 displays a first side wall 12a, facing towards the flow gap 5, the first side wall having a surface of extension which substantially coincides with said first flow direction $F_1$, as well as a second side wall 12b facing towards the mould cavity 7, the second side wall 12b having a surface of extension which is angled in relation to said first flow direction $F_1$ and preferably also in relation to said second flow direction $F_2$.

The first tool part 1a, 1b further displays a first elongate and preferably continuous sealing lip 13 which defines a distal end of the mould cavity 7 for the plastic, on the first side 9a of the packaging material 9. The second tool part correspondingly displays a second elongate and preferably continuous sealing lip 14 which defines a distal end of the mould cavity 7 for the plastic, on the second side 9b of the packaging material 9, the first sealing lip 13 preferably being disposed more proximal the inlet 10 than the second sealing lip 14. The mould cavity 7 is moreover suitably deeper on the second side 9b of the packaging material 9 (measured as the distance between the levels of the sealing lip 14 and the lowest point of the mould cavity in the second tool part 2 and given as x) than on the first side 9a of the packaging material 9 (measured as the distance between the levels of the sealing lip 13 and the highest point of the mould cavity of the first tool part 1a, 1b and given as y). However, it suitably applies that x>y>0.5*x, preferably x>y>0.6*x and even more preferably x>y>0.7*x, i.e. the cavity on the first side 9a of the packaging material 9 may not be too narrow for it to be ensured that a flange is de facto formed there.

A cavity 16 is disposed in the first tool part 1a, 1b in a position which corresponds to the position of the sealing lip 14, and so the packaging material can be received in this cavity 16 in such a manner that the sealing lip 14 does not penetrate the inside layer of the packaging material on its second side 9b. The sealing lip 13 terminates at a level above that of the upper wall of the end gap 11 in the first tool part 1a, 1b. The sealing lip 14 terminates at a level below the upper wall of the end gap 11 in the first tool part 1a, 1b. The tip/end of the throttle lip 12 lies substantially flush with the level of the sealing lip 14, preferably within 40%, even more preferably within 30% and most preferably within 20% from said level of the sealing lip 14, calculated on a gap width between the sealing lips 13 and 14. Most preferably, the tip/end of the throttle lip 12 lies a slight distance below the level of the sealing lip 14, preferably at most 30%, even more preferably at most 20% and most preferably at most 10% below said level of the sealing lip 14, calculated on the gap width between the sealing lips 13 and 14.

Figure 2B:
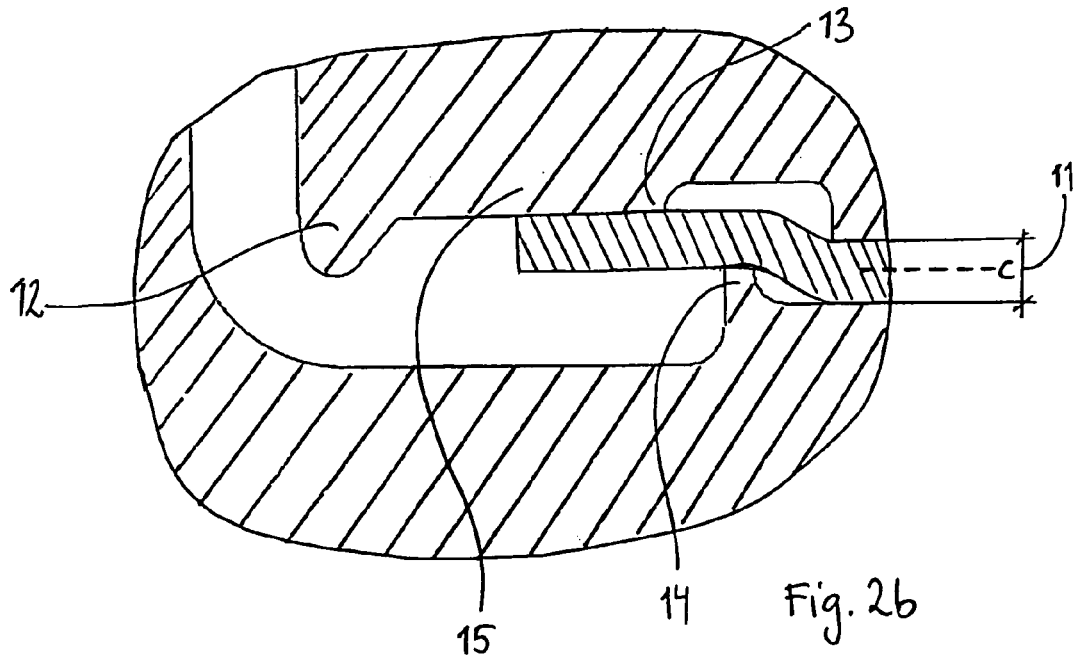
FIG. 2b shows, on a larger scale, a part of the tool of FIG. 1, with a hole edge of a packaging material disposed therein.

FIG. 2b shows in section how the first tool part 1a, 1b may moreover display intermittently disposed spacer grooves 15, disposed between the throttle lip 12 and the first sealing lip 13. The design and positioning of the sealing lips 13, 14 are, together with the design and positioning of the spacer grooves 15, adapted to ensure the positioning of the hole edge 8 in the mould cavity 7.

FIG. 3 and FIG. 4 show an opening arrangement which has been formed in the tool of FIG. 1, seen in cross section and in perspective, respectively. The opening arrangement is generically designated by reference numeral 20 and is here shown without the packaging material and the hole in which it is formed directly by injection moulding. Where possible reference numerals have been employed which correspond to the same part in the tool 1a, 1b, 2, but with the addition of a primus symbol, in which event, for example, the flow gap 5 in the tool in FIG. 1 and FIGS. 2a-b has its counterpart in the edge portion 5' in FIG. 3 and FIG. 4.

The lid 4' of the opening arrangement merges towards the edge portion 5' in a thin, rupturable sealing portion 6 which extends along a peripheral edge or a flange 22 around the edge portion 5' and which is ruptured when the opening arrangement 20 is to be opened. In such instance, the edge portion 5' defines the pouring aperture proper of the opening arrangement. The inlet 10 in the tool forms a deflected portion 10' of the opening arrangement, located between the edge portion 5' and a portion 7' surrounding the hole edge 8 (not shown in FIGS. 3 and 4) which is formed by the mould cavity 7 in the tool. The hole edge 8 of the packaging material is disposed in the groove 11'. The preferably continuous throttle lip 12 in the tool forms a preferably continuous depression 12' in the opening arrangement, located between the edge portion 5' and the surrounding portion 7' at the deflected portion 10'. The depression 12' has a depth which, in its direction, substantially coincides with the direction of extension of the edge portion 5', hereafter referred to as first direction of extension. The bottom of the depression 12' lies substantially flush with a centre line c for the extension of the packaging material out of the surrounding portion 7', the level of the bottom of the depression preferably lying within 40%, even more preferably within 30%7c and most preferably within 20% from said centre line c, calculated on the thickness of the packaging material. However, it may alternatively be the case, depending on the deflecting effect of the sealing lips 13, 14 on the hole edge in the mould cavity 7, that the bottom of the depression 12' lies substantially flush with the underside of the hole edge (i.e. the inside of the packaging container), preferably within 40%, even more preferably within 30% and most preferably within 20% from said level of the underside of the hole, edge, calculated on the thickness of the packaging material. Most preferably, the bottom of the depression 12' lies slightly below the level of the underside of the hole edge, preferably at most 30%, even more preferably at most 30% and most preferably at most 10% below said level of the underside of the hole edge, calculated on the thickness of the packaging material.

According to one aspect of the present invention, said first direction of extension $U_1$, corresponding to said first flow direction $F_1$, and a second major direction of extension $U_2$ for the surrounding portion 7', corresponding to said second flow direction $F_2$, make an angle of 20-120°, preferably 30-110° and even more preferably 40-100° to one another.

Further, the depression 12' displays a first side wall 12a' facing towards the edge portion 5', the first side wall having a surface of extension which substantially coincides with the first direction of extension $U_1$, as well as a second side wall 12b', facing towards the surrounding portion 7', the second side wall having a surface of extension which is angled in relation to said first direction of extension $U_1$, and preferably also in relation to said second direction of extension $U_2$.

The surrounding portion 7' extends further out in a second flange 7'b on the second side 9b of the packaging material (see FIGS. 2a and 3), which constitutes the inside of the packaging container, than in a first flange 7'a on the first side 9a of the packaging material (see FIGS. 2a and 3), which constitutes the outside of the packaging container. It is also conceivable, as illustrated in FIG. 4, that this relationship be the reverse. However, that which is illustrated in FIG. 3 is the appearance which is attained by the tool according to FIGS. 2a-b, the sealing lips 13 and 14 defining how far out the flanges 7'a and 7'b, respectively, extend.

FIG. 4 however illustrates the result of the spacer grooves 15 according to FIG. 2b, the spacer grooves 15 taking expression as intermittently disposed recesses 15' in the first flange 7'a and being typically between two and ten in number, preferably between four and eight in number. At these recesses 15', the flange 7'a terminates at the hole edge (see FIG. 2b).

FIG. 4 also shows that the opening arrangement, according to one preferred embodiment, displays a tip/angle 24 in the edge portion 5', the tip/angle 24 defining a "pouring spout". A gripping handle 26 is provided for gripping when opening the opening arrangement, and a seal 28 is disposed between the gripping handle 26 and the flange 22 of the edge portion, the seal showing if the opening arrangement has been opened or if it is unbroken. Projections 30 are provided on an edge portion 34 of the lid, the purpose of the projections being, by snap function, to reclose the lid 4' against the edge portion 5'. The lid 4' is further suspended by "hinge" against the edge portion 5' in a fold indication 32.

The present invention is not restricted to the described embodiments, but may be varied without departing from the scope of the appended claims.

What is claimed is:

1. A tool for injection moulding of an opening arrangement of plastic in a hole in a sheet- or web-shaped packaging material, the hole defining a hole edge and the tool comprising at least one first tool part adapted to be brought into contact with a first side of the packaging material, and at least one second tool part adapted to be brought into contact with a second side of the packaging material, in such a manner that there is formed a mould cavity which surrounds said hole edge, together with a part of the first side of the packaging material, as well as a part of the second side of the packaging material in connection with the hole edge, the mould cavity displaying an inlet for molten plastic and, opposing the inlet, an end gap for the extension of the packaging material out of the tool, the end gap being located between the first and the second tool parts, the inlet forming a deflection from a first flow direction in a flow gap to a second flow direction into said mould cavity that is different from the first flow direction, wherein the first tool part, at said inlet, displays a continuous throttle lip which projects in a direction which substantially coincides with said first flow direction.

2. The tool as claimed in claim 1, wherein a tip of said throttle lip lies substantially flush with a centre line of the end gap, the level of the tip of the throttle lip lying within 40% from said centre line, calculated on the width of the end gap.

3. The tool as claimed in claim 1, wherein said first flow direction and said second flow direction make an angle of 20-120° with one another.

4. The tool as claimed in claim 1, wherein said throttle lip displays a first side wall facing towards the flow gap, the first side wall having a surface of extension which substantially coincides with said first flow direction, and a second side wall facing towards the mould cavity, the second side wall having a surface of extension which is angled in relation to said first flow direction and also in relation to said second flow direction.

5. The tool as claimed in claim 1, wherein said first tool part displays a first sealing lip which defines a distal end of the mould cavity for the plastic, on the first side of the packaging material, and wherein said second tool part displays a second sealing lip which defines a distal end of the mould cavity for the plastic on the second side of the packaging material, said first sealing lip being disposed more proximal the inlet than said second sealing lip.

6. The tool as claimed in claim 5, wherein a tip of said throttle lip lies substantially flush with a level of an end of the second sealing lip, within 40% from said level of the end of the second sealing lip.

7. The tool as claimed in claim 5, wherein a dimension x of the mould cavity measured as the distance between the level of the end of the second sealing lip and the lowest point of the mould cavity of the second tool part is greater than a dimension y of the mould cavity measured as the distance between the level of an end of the first sealing lip and the highest point of the mould cavity of the first tool part, wherein x>y>0.5*x.

8. The tool as claimed in claim 5, wherein said first tool part displays intermittently disposed spacer grooves disposed between said throttle lip and said first sealing lip.

9. The tool as claimed in claim 1, wherein a tip of said throttle lip lies substantially flush with a centre line of the end gap, the level of the tip of the throttle lip lying within 30% from said centre line, calculated on the width of the end gap.

10. The tool as claimed in claim 1, wherein a tip of said throttle lip lies substantially flush with a centre line of the end gap, the level of the tip of the throttle lip lying within 20% from said centre line, calculated on the width of the end gap.

11. The tool as claimed in claim 1, wherein said first flow direction and said second flow direction make an angle of 30-110° with one another.

12. The tool as claimed in claim 1, wherein said first flow direction and said second flow direction make an angle of 40-100° with one another.

13. The tool as claimed in claim 5, wherein a tip of said throttle lip lies substantially flush with a level of an end of the second sealing lip, within 30% from said level of the end of the second sealing lip.

14. The tool as claimed in claim 5, wherein a tip of said throttle lip lies substantially flush with a level of an end of the second sealing lip, within 20% from said level of the end of the second sealing lip.

15. The tool as claimed in claim 5, wherein a tip of said throttle lip lies slightly below the level of the end of the second sealing lip.

16. The tool as claimed in claim 5, wherein a dimension x of the mould cavity measured as the distance between the level of the end of the second sealing lip and the lowest point of the mould cavity of the second tool part is greater than a dimension y of the mould cavity measured as the distance between the level of an end of the first sealing lip and the highest point of the mould cavity of the first tool part, wherein y x>y>0.6*x.

17. The tool as claimed in claim 5, wherein a dimension x of the mould cavity measured as the distance between the level of the end of the second sealing lip and the lowest point of the mould cavity of the second tool part is greater than a dimension y of the mould cavity measured as the distance between the level of an end of the first sealing lip and the highest point of the mould cavity of the first tool part, wherein x>y>0.7*x.

18. A tool for injection moulding of an opening arrangement of plastic in a hole in a sheet- or web-shaped packaging material, the hole defining a hole edge and the tool comprising at least one first tool part adapted to be brought into contact with a first side of the packaging material, and at least one second tool part adapted to be brought into contact with a second side of the packaging material, in such a manner that there is formed a mould cavity which surrounds said hole edge, together with a part of the first side of the packaging material, as well as a part of the second side of the packaging material in connection with the hole edge, the mould cavity displaying an inlet for molten plastic and, opposing the inlet, an end gap for the extension of the packaging material out of the tool, the end gap being located between the first and the second tool parts, the inlet forming a deflection from a first flow direction in a flow gap to a second flow direction into said mould cavity, wherein the first tool part, at said inlet, displays a throttle lip which projects in a direction which substantially coincides with said first flow direction, the throttle lip possessing first and second side walls, the first side wall facing the flow gap so that the molten plastic flowing in the flow gap in the first flow direction contacts the first side wall, the second side wall facing the mould cavity so that the molten plastic in the mould cavity contacts the second side wall.

19. A tool for injection moulding of an opening arrangement of plastic in a hole in a sheet- or web-shaped packaging material, the hole defining a hole edge and the tool comprising at least one first tool part adapted to be brought into contact with a first side of the packaging material, and at least one second tool part adapted to be brought into contact with a second side of the packaging material, in such a manner that there is formed a mould cavity which surrounds said hole edge, together with a part of the first side of the packaging material, as well as a part of the second side of the packaging material in connection with the hole edge, the mould cavity displaying an inlet for molten plastic and, opposing the inlet, an end gap for the extension of the packaging material out of the tool, the end gap being located between the first and the second tool parts, the inlet displaying a deflection from a first flow direction in a flow gap to a second flow direction into said mould cavity, wherein the first tool part, at said inlet, displays a throttle lip which projects in a direction which substantially coincides with said first flow direction, at least one of said first and second tool parts comprising a sealing lip which defines a distal end of the mould cavity for the plastic on one side of the packaging material, the sealing lip being spaced from the end gap inwardly towards the mould cavity.

20. The tool as claimed in claim 19, wherein the sealing lip is a first sealing lip defining the distal end of the mould cavity for the plastic on the one side of the packaging material, and comprising a second sealing lip defining the distal end of the mould cavity for the plastic on the opposite side of the packaging material, the first sealing lip being disposed more proximal the inlet than the second sealing lip.

21. A method of injection moulding an opening arrangement of plastic in a hole in a sheet- or web-shaped packaging material, the hole defining a hole edge which, during injection moulding, is surrounded by a mould cavity which also surrounds a part of a first side of the packaging material as well as a part of a second side of the packaging material, and the mould cavity displaying an inlet for molten plastic and, opposing the inlet, an end gap for extension of the packaging material out of the mould cavity, the method comprising:
 introducing molten plastic into a flow gap so that the molten plastic flows in a first flow direction, with the flow of the molten plastic being deflected at the inlet from the first flow direction to a different second flow direction into the mould cavity; and
 the flow of molten plastic at the inlet being guided past a continuous throttle lip projecting in a direction substantially coinciding with the first flow direction.

22. The method as claimed in claim 21, wherein the flow of molten plastic is guided past a tip of the throttle lip which lies substantially flush with a centre line of the end gap, the level of the tip of the throttle lip lying within 40% from the centre line calculated on the width of the end gap.

23. The method as claimed in claim 21, wherein the flow of molten plastic is guided past a tip of the throttle lip which lies substantially flush with a centre line of the end gap, the level of the tip of the throttle lip lying within 30% from the centre line calculated on the width of the end gap.

24. The method as claimed in claim 21, wherein the flow of molten plastic is guided past a tip of the throttle lip which lies substantially flush with a centre line of the end gap, the level of the tip of the throttle lip lying within 20% from the centre line calculated on the width of the end gap.

25. The method as claimed in claim 21, wherein the flow of molten plastic is deflected at the inlet at an angle of 20-120° from the first flow direction to the second flow direction.

26. The method as claimed in claim 21, wherein the flow of molten plastic is deflected at the inlet at an angle of 30-100° from the first flow direction to the second flow direction.

27. The method as claimed in claim 21, wherein the flow of molten plastic is deflected at the inlet at an angle of 40-100° from the first flow direction to the second flow direction.

28. The method as claimed in claim 21, wherein the packaging material and the hole edge are positioned in the mould cavity with the aid of sealing lips abutting against the first and second sides of the packaging material.

29. The method as claimed in claim 21, wherein the packaging material and the hole edge are positioned in the mould cavity with the aid of sealing lips abutting against the first and second sides of the packaging material and spacer grooves intermittently disposed on the first side of the packaging material at a position between the throttle lip and the sealing lip on the first side of the packaging material.

* * * * *